(12) United States Patent
Yao

(10) Patent No.: US 12,722,574 B2
(45) Date of Patent: Sep. 1, 2026

(54) ROOF BOX FAST CLIP

(71) Applicant: SHINEKIN PRECISION INDUSTRIAL CO., LTD., Shangrao (CN)

(72) Inventor: Xiong Yao, Shangrao (CN)

(73) Assignee: Shinekin Precision Industrial Co., LTD., Shangrao (CN)

(*) Notice: Subject to any disclaimer, the term of this patent is extended or adjusted under 35 U.S.C. 154(b) by 17 days.

(21) Appl. No.: 18/827,954

(22) Filed: Sep. 9, 2024

(65) Prior Publication Data

US 2024/0424996 A1 Dec. 26, 2024

Related U.S. Application Data

(63) Continuation of application No. PCT/CN2022/111353, filed on Aug. 10, 2022.

(30) Foreign Application Priority Data

Mar. 30, 2022 (CN) ......................... 202220712750.1

(51) Int. Cl.
*B60R 9/058* (2006.01)
*B60R 9/055* (2006.01)

(52) U.S. Cl.
CPC .............. *B60R 9/055* (2013.01); *B60R 9/058* (2013.01)

(58) Field of Classification Search
CPC ..... B60R 9/058; B60R 2011/0059; F16B 2/12
USPC ........................................ 224/319; 248/316.4
See application file for complete search history.

(56) References Cited

U.S. PATENT DOCUMENTS 8,444,033 B2 * 5/2013 Brochier ................ B60R 9/045 224/315
2015/0157885 A1 6/2015 Liu

FOREIGN PATENT DOCUMENTS

| | | | | |
|---|---|---|---|---|
| CN | 105644451 A | 6/2016 | | |
| CN | 114604179 A | 6/2022 | | |
| EP | 3241710 A1 | 11/2017 | | |
| EP | 3552880 A1 * | 10/2019 | ............ | B60R 9/048 |
| JP | H0979223 A | 3/1997 | | |
| WO | 2010054836 A2 | 5/2010 | | |
| WO | 2011102780 A1 | 8/2011 | | |

* cited by examiner

*Primary Examiner* — Justin M Larson
(74) *Attorney, Agent, or Firm* — JEEN IP LAW, LLC

(57) ABSTRACT

The present disclosure provides a quick clip for a roof box compartment, pertaining to the automotive parts industry. It comprises a cover plate, a base, a locking mechanism, and a first and second clamping piece installed within the base and facing each other. The locking mechanism is flexibly mounted on the base and elastically connected to the first clamping piece. The cover plate is hinged to the base and linked to the second clamping piece. The first clamping piece shifts on the base when the locking mechanism is unlocked (first state) and fixes when locked (second state). The second clamping piece slides back when the cover plate opens (first state) and towards the first piece when closed (second state). This model boasts a simple structure and easy operation.

10 Claims, 6 Drawing Sheets

ROOF BOX FAST CLIP

CROSS-REFERENCE TO RELATED APPLICATIONS

This application is a continuation of International Application No. PCT/CN2022/111353, filed on Aug. 10, 2022, which claims priority to Chinese Patent Application No. 202220712750.1, filed with the China National Intellectual Property Administration on Mar. 30, 2022, titled "ROOF BOX FAST CLIP", both of which are hereby incorporated by reference in their entireties.

TECHNICAL FIELD

The present disclosure relates to the field of car accessories technologies, and in particular, to a roof box fast clip.

BACKGROUND

Nowadays, most vehicles use luggage compartments with horizontal bar brackets connecting the luggage bars. There are many ways to connect the luggage compartment to the horizontal bar brackets, such as clip mechanisms, bolt connections, etc. However, these structures are very inconvenient to install and have complex structures;

The existing clamp mechanism includes a pair of claws and a transmission mechanism that links the two together. The transmission mechanism is controlled by a knob, and the relative motion between the claws is manually rotated to control the clamping and releasing of the crossbar bracket by the claws. In addition, the clamp mechanism also includes a locking component. After the claws clamp the crossbar bracket, the locking component is moved to lock the position of the claws. This structure has the problems of complex structure and long operation time;

Also, the clamp mechanism is used to clamp the crossbar bracket through the shell of the luggage compartment. The existing clamp mechanism has a complex structure, large thickness, and is prone to occupying space in the luggage compartment.

SUMMARY

In order to overcome the shortcomings of the background technology, the present utility model provides a fast clip of roof box compartment with a simple structure and easy operation.

The technical solution adopted by the present utility model is a fast clip for a roof box compartment, which comprises a cover plate, a base, a locking mechanism, and a first clamping piece and a second clamping piece that are slidably installed inside the base and are relatively arranged. The locking mechanism is installed on the base and is elastically connected to the first clamping piece. The cover plate is hinged and installed on the base and is linked to the second clamping piece. The first clamping piece has a first state of sliding and cooperating with the base after the locking mechanism is unlocked, and a second state of being fixed on the base after the locking mechanism is locked. The second clamping piece has a first state of sliding backward when the cover plate is opened, a first state of clamping towards the first clamping piece when the cover plate is closed, and a second state of sliding in the direction of the component.

The first clamping piece comprises a first sliding block portion installed in the base and a first hook portion extending downward and passing through the base. The bottom surface of the base is provided with a first passage groove for the first hook portion to pass through.

The second clamping piece comprises a second sliding block portion installed in the base by sliding, and a second hook portion extending downward and passing through the base. The bottom surface of the base is provided with a second passage groove for the second hook portion to pass through.

In an embodiment of the present disclosure, the locking mechanism is provided with a first ratchet portion, and the inner bottom surface of the base is provided with a second ratchet portion that meshes with the first ratchet portion. The locking mechanism has a first state in which the first ratchet portion and the second ratchet portion mesh when not under force, and a second state in which the first ratchet portion and the second ratchet portion separate after being under force.

The locking mechanism comprises:

- a locking block, which is movable and installed inside the base, and the first ratchet portion is located on its lower surface;
- a connecting bolt that penetrates and connects the locking block and the first clamping piece;
- an elastic component, which is fitted onto the connecting bolt and has two ends respectively resisting the locking block and the first clamping piece;

The end of the connecting bolt is equipped with a nut.

The upper surface of the locking block is provided with a pressing plate, and the connection point between the connecting bolt and the locking block is located between the pressing plate and the first ratchet portion. The pressing plate is located behind the connection point and the first ratchet portion is located in front of the connection point. There is a height difference between the pressing plate and the first sliding block portion.

The locking block is equipped with a hook plate at a position in front of the pressing plate, and there is a distance for fingers to insert between the hook plate and the first ratchet portion.

The locking block is equipped with a first mounting hole for connecting bolts to pass through, and the first clamping piece is equipped with a second mounting hole for connecting bolts to pass through. Both the first and second mounting holes are strip-shaped holes.

The cover plate is hinged and installed at the end position of the base. The lower surface of the cover plate is provided with an installation seat, and a linkage rod is provided between the installation seat and the second clamping piece for hinged connection. The inner walls on both sides of the base are provided with sliding grooves for embedded sliding installation of the second sliding block.

The base is composed of a left support and a right support arranged opposite to each other, and the left support and the right support are fixedly connected by bolts; There are through holes on both sides of the base for straps to pass through.

The beneficial effect of this utility model is that the first clamping piece of the technical solution can slide on the base after the locking mechanism is unlocked. When the first clamping piece and the second clamping piece clamp an object and the locking mechanism is locked, the first clamping piece is fixed and cannot move. During the process of turning the cover plate from open to closed, the cover plate can drive the second clamping piece to slide in the direction of the first clamping piece on the base, improving the clamping force on the object. It has the advantages of simple structure and convenient operation.

DESCRIPTION OF EMBODIMENTS

Figure 1:
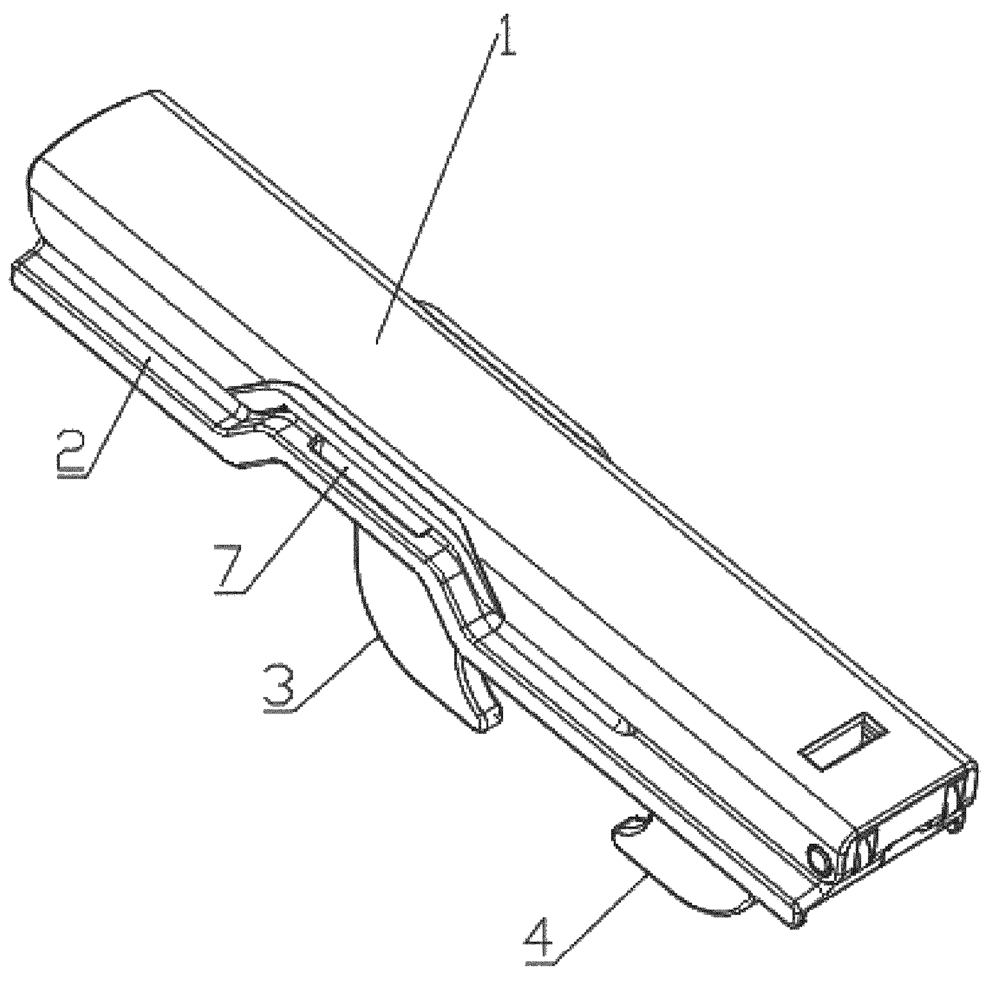
FIG. 1 is a schematic diagram of the structure of the fast clip of the roof box compartment in the embodiment of the present utility model.

The following is a further explanation of the embodiments of the present disclosure in combination with the drawings.

As shown in the drawings, the fast clip of the roof box compartment includes a cover plate 1, a base 2, a locking mechanism 5, and a first clamping piece 3 and a second clamping piece 4 that are slidably installed inside the base 2 and are relatively arranged. The locking mechanism 5 is installed on the base and is elastically connected to the first clamping piece 3. The cover plate 1 is hinged and installed on the base 2 and is linked to the second clamping piece 4. The first clamping piece 3 has a first state of sliding and cooperating with the base 2 after the locking mechanism 5 is unlocked, and a second state of being fixed on the base 2 after the locking mechanism 5 is locked. The second clamping piece 4 has a backward position when the cover plate 1 is opened. The first state of sliding and the second state of sliding towards the first clamping piece 3 when the cover plate 1 is closed. The first clamping piece 3 of this technical solution can slide on the base after the locking mechanism is unlocked. When the first clamping piece 3 and the second clamping piece 4 clamp an object and the locking mechanism is locked, the first clamping piece 3 is fixed. During the process of turning the cover plate from open to closed, the cover plate can drive the second clamping piece 4 to slide in the direction of the first clamping piece 3 on the base, improving the clamping force on the object. It has the advantages of simple structure and convenient operation.

In addition, the fast clip structure in this embodiment is simple and has a flattened structure. The thickness of the cover plate can be made thin, and the installation positions of the first clip, the second clip, and the locking mechanism are all on the same horizontal plane, greatly reducing the occupied space and allowing the luggage compartment on the roof to have more space to accommodate luggage.

The installation process of this technical solution is as follows:

step 1. Open the cover plate to a vertical position, and the second clamping piece 4 is driven to the rightmost end of the base;

step 2. Press or hook the pressing plate of the locking block to unlock it, manually drive the locking mechanism and the first clamping piece 3 to move, adjust the distance between the first clamping piece 3 and the second clamping piece 4 to fit the clamped object;

step 3. After clamping the object, both the first clamping p and the second clamping piece 4 are in contact with the object, and the cover plate is closed. During the closing process, the second clamping piece 4 moves towards the first clamping piece 3 until the cover plate is completely closed.

In step 3, the object is fixed and immovable. Specifically, it is a horizontal bar bracket on the roof for installing the luggage compartment. The distance between the first clamping piece 3 and the locking mechanism can compensate for the margin, and the elastic component provides a pre tension force for the first clamping piece 3 to always resist the object. When the first clamping piece 3 moves towards the locking block direction and reaches the limit position, it is just below the pressing plate. At this time, the pressing plate cannot be pressed down, and there will be no accidental unlocking situation.

The left and right sides in step 1 can be determined according to FIG. 1, with the first clamping piece 3 on the left and the second clamping piece 4 on the right.

The locking mechanism in this embodiment adopts elastic fit with the first clamping piece 3, and there is a distance between them. Therefore, when clamping an object and the second clamping piece 4 is driven by the cover plate to move in the direction of the first clamping piece 3, the first clamping piece 3 will be pushed by the force transmitted by the second clamping piece 4 to slide in the direction of the locking mechanism for a certain distance. Under the action of elastic force, the first clamping piece 3 and the second clamping piece 4 always firmly clamp the object.

The first clamping piece 3 comprises a first sliding block portion 31 installed in the base 2 and a first hook portion 32 extending downward and passing through the base 2. The bottom surface of the base 2 is provided with a first passage groove 21 for the first hook portion 32 to pass through, and the first sliding block portion 31 drives the first hook portion to pass through the first passage groove during sliding.

The second clamping piece 4 includes a second sliding block portion 41 that is slidably installed inside the base 2, and a second hook portion 42 that extends downward and passes through the base 2. The bottom surface of the base 2 is provided with a second passage groove 22 for the second hook portion to pass through, and the second clamping piece 4 has the same motion principle as the first clamping piece 3.

The locking mechanism is provided with a first ratchet portion 55, and the inner bottom surface of the base is provided with a second ratchet portion that meshes with the first ratchet portion. The locking mechanism has a first state in which the first ratchet portion 55 and the second ratchet portion 23 mesh when not under force, and a second state in which the first ratchet portion 55 and the second ratchet portion 23 separate after being under force.

The locking mechanism 5 comprises:

a locking block 51, its movable installation is inside the base 2, and the first ratchet portion 55 is located on its lower surface;

a connecting bolt 52, which penetrates and connects the locking block 51 and the first clamping piece 3;

an elastic component 53, which is fitted onto the connecting bolt 52 and has two ends respectively resisting the locking block 51 and the first clamping piece 3;

one end of the connecting bolt 52 is equipped with a nut 54.

The upper surface of the locking block 51 is provided with a pressing plate 56, and the connection point between the connecting bolt 52 and the locking block 51 is located between the pressing plate 56 and the first ratchet portion 55. The pressing plate 56 is located behind the connection point and the first ratchet portion 55 is located in front of the connection point. The elastic component 53 is in contact with the locking block 51 and the first clamping piece 3, and the distance between the first clamping piece 3 and the locking block provides a margin for the movement of the first clamping piece 3. Because in step 1, after the first clamping piece 3 and the second clamping piece 4 clamp the object, under the action of the cover plate, the second clamping piece 4 will be driven to move in the direction of the first clamping piece 3. On the premise that the distance between the first clamping piece 3 and the second clamping piece 4 remains unchanged, the first clamping piece 3 will inevitably move in the direction of the locking block. After the cover plate is closed, the side wall of the first clamping piece 3 will contact and cooperate with the side wall of the locking block, and the first teeth of the locking block will cooperate with the second teeth of the base to provide support for the first clamping piece 3.

Among them, in the unlocked state, the elastic component 53 can maintain an appropriate distance between the locking block and the first clamping piece 3, and the connecting bolt and nut can adjust the size of the distance. In the locked state, the first clamping piece 3 moves in the direction of the locking block after receiving the force transmitted by the second clamping piece 4, overcoming the pre tightening force of the elastic component 53 and eliminating the distance.

Figure 2:
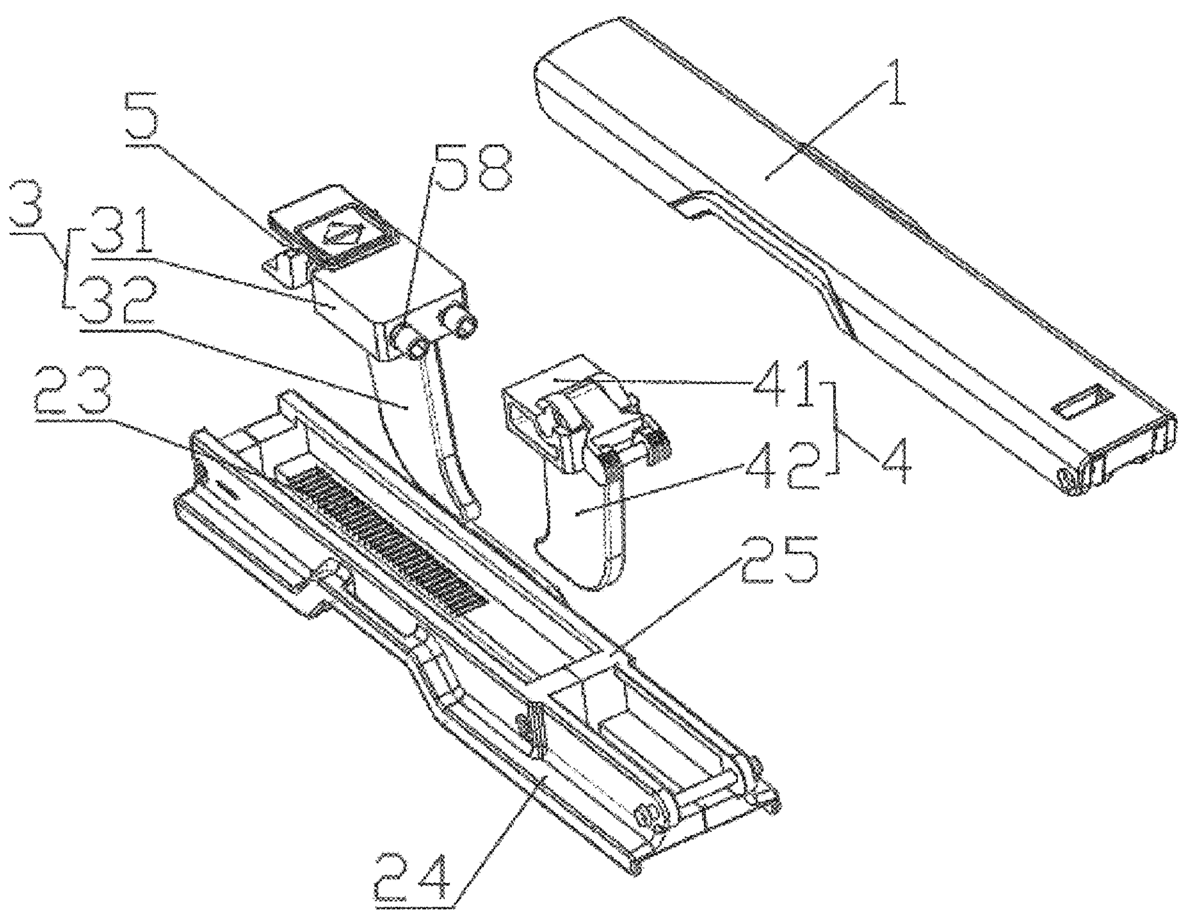
FIG. 2 is a schematic diagram of the disassembly structure of the fast clip of the roof box compartment.
Figure 3:
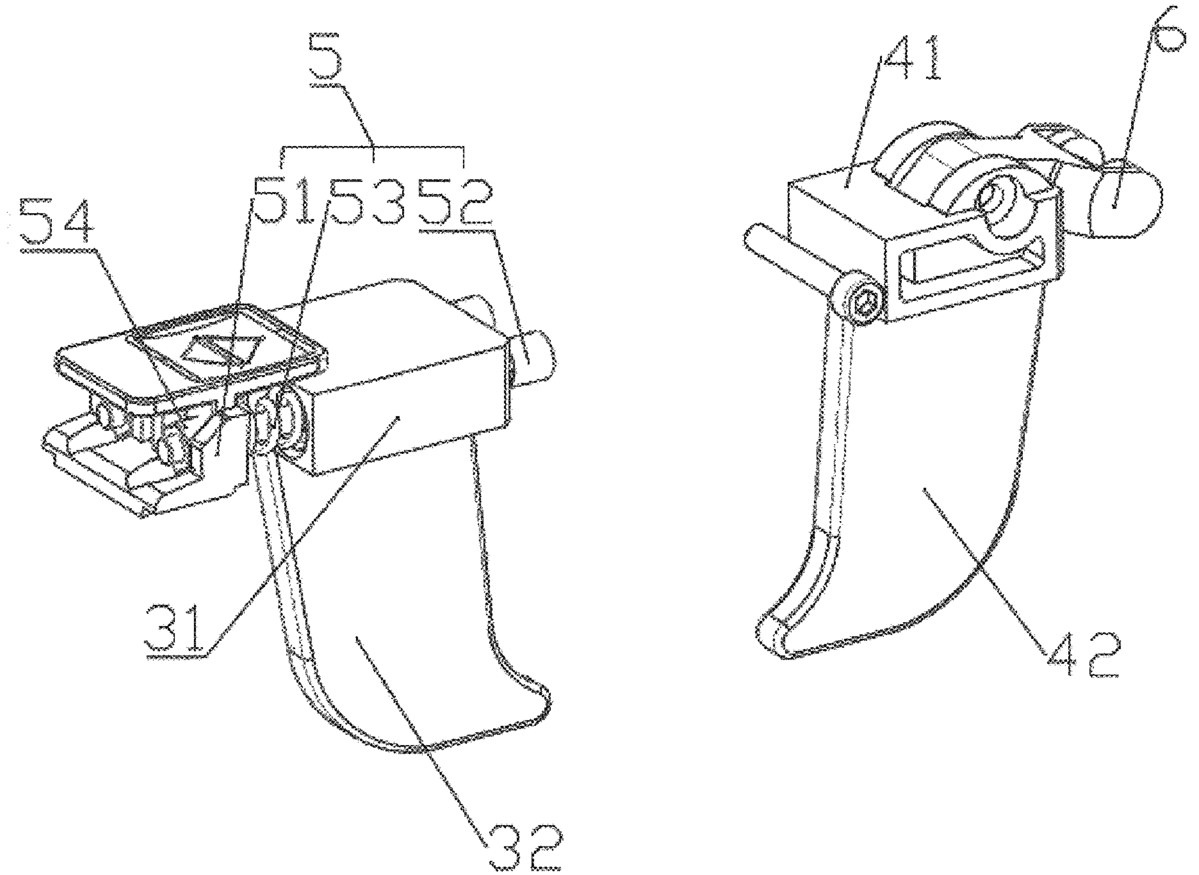
FIG. 3 is a schematic diagram of the structure of the first clamping piece, locking mechanism, and second clamping piece.
Figure 4:
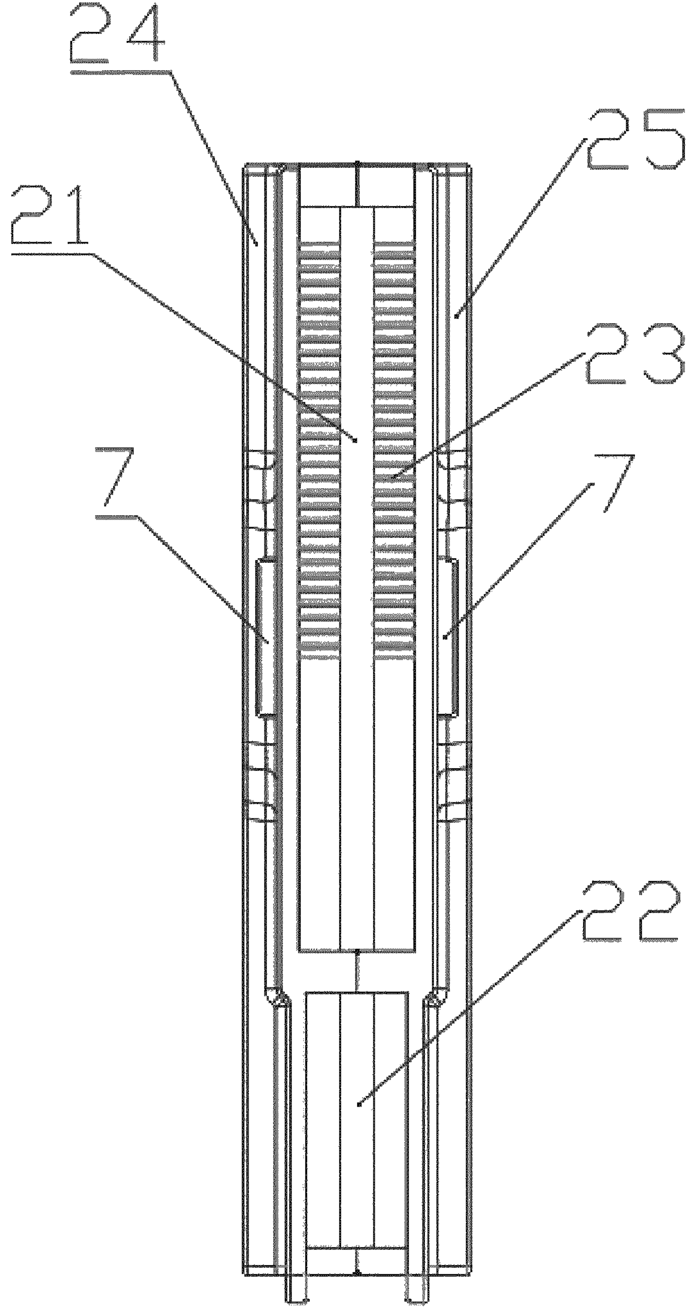
FIG. 4 is a top view of the base.
Figure 5:
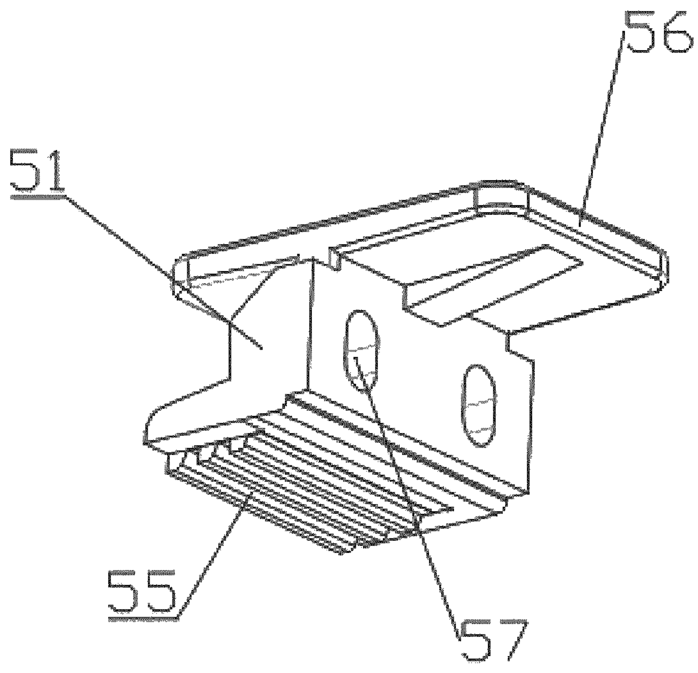
FIG. 5 is a schematic diagram of the structure of the locking block.
Figure 6:
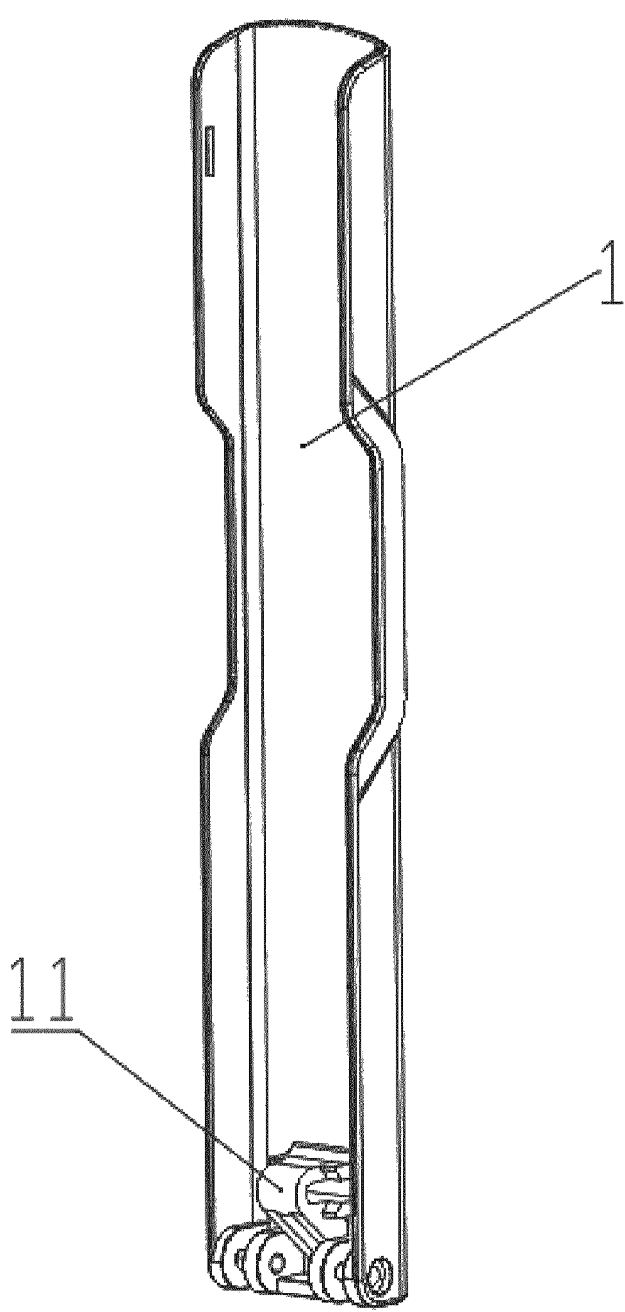
FIG. 6 is a schematic diagram of the structure of the cover plate.

In addition, the first and second ratchet teeth in this embodiment are engaged, which can achieve the locking of the locking block and the base. As shown in FIG. 2, the locking block cannot move forward when locked, but can move backward, with the function of one-way movement.

The upper surface of the locking block 51 is provided with a pressing plate 56, and the connection point between the connecting bolt 52 and the locking block 51 is located between the pressing plate 56 and the first ratchet portion 55. The pressing plate 56 is located behind the connection point and the first ratchet portion 55 is located in front of the connection point. When the pressing plate is under force, due to the lever principle, the first ratchet portion will lift upward, allowing the locking block to separate from the base and achieve unlocking. After unlocking, the locking mechanism can slide freely on the base with the first clamping piece 3, and the elastic component 53 can provide pre tension for the reset of the locking block.

There is a height difference between the pressing plate 56 and the first sliding block portion 31. In step 3, when the first clamping piece 3 overcomes the pre tension force of the elastic component 53 and moves towards the locking mechanism, the first clamping piece 3 is located below the pressing plate. This way, the pressing plate will be blocked by the first clamping piece 3, preventing the locking block from being subjected to force and causing it to lift and unlock.

The locking block 51 is provided with a first mounting hole 57 for the connecting bolt 52 to pass through, and the first clamping piece 3 is provided with a second mounting hole 58 for the connecting bolt 52 to pass through. Both the first and second mounting holes use strip-shaped holes, and when the locking block is lifted, the connecting bolt will have a restriction on both. Therefore, in order to lift this restriction, strip-shaped holes are provided on the locking block and the first clamping piece 3, so that when the locking block is lifted under pressure, the connecting bolt also swings upward at an appropriate angle. The elastic component 53 provides pre tension for the reset of the locking block.

The locking block 51 is provided with a hook plate 59 at a position in front of the pressing plate 56, and there is a distance for fingers to insert between the hook plate 59 and the first ratchet portion 55. In this embodiment, there is another unlocking method, which can also lift the first ratchet portion upward by hooking the hook plate with fingers.

The cover plate 1 is hinged and installed at the end position of the base 2. The lower surface of the cover plate 1 is provided with an installation seat 11, and a linkage rod 6 is provided between the installation seat and the second clamping piece 4 for hinged connection. The inner walls on both sides of the base 2 are provided with sliding grooves 26 for the embedded sliding installation of the second sliding block part 41. During the opening and closing process, the cover plate drives the second clamping piece 4 to slide in the sliding groove through the linkage rod.

The base 2 consists of a left support 24 and a right support 25 arranged opposite each other on the left and right sides. The left support 24 and the right support 25 are fixedly connected by bolts, and the installation of each component is more convenient by setting up the left and right supports.

The two sides of the base 2 are provided with through holes 7 for straps to pass through, and the straps can fix the luggage inside the luggage compartment.

In the description of this utility model, it should be noted that the terms "center", "longitudinal", "transverse", "up", "down", "front", "back", "left", "right", "vertical", "horizontal", "top", "bottom", "inside", "outside" and other directional or positional relationships are based on the directional or positional relationships shown in the accompanying drawings, only for the convenience of describing this utility model and simplifying the description, and do not indicate or imply that the device or component referred to must have a specific orientation, be constructed and operated in a specific orientation, and therefore cannot be understood as a limitation of this utility model. In addition, the terms "first" and "second" are only used for descriptive purposes and cannot be understood as indicating or implying relative importance.

In the description of this utility model, it should be noted that unless otherwise specified and limited, the terms "installation", "connection", and "connection" should be broadly understood, for example, they can be fixed connections, detachable connections, or integrated connections; It can be a mechanical connection or an electrical connection; It can be directly connected, indirectly connected through an intermediate medium, or connected internally between two components. For ordinary technical personnel in this field, the specific meanings of the above terms in this utility model can be understood in specific situations. In addition, in the description of this utility model, unless otherwise specified, the meaning of "multiple" refers to two or more.

Those skilled in the art should be noted that: although the present disclosure has been described according to the above specific embodiments, an inventive idea of the present disclosure is not limited to the present disclosure. Any modification that applies the inventive idea will be included in the protection scope of the present disclosure.

What is claimed is:

1. A fast clip for a roof box compartment, comprising: a cover plate, a base, a locking mechanism, and a first clamping piece and a second clamping piece that are slidably installed inside the base and are relatively arranged;

the locking mechanism is installed on the base and elastically connected to the first clamping piece;

the cover plate is hinged and installed on the base and is linked to the second clamping piece;

the first clamping piece has a first state of sliding cooperation with the base after the locking mechanism is unlocked, and a second state of sliding cooperation with the base after locking;

the locking mechanism is locked and fixed on the base in the second state, and the second clamping piece has a first state of sliding backward when the cover plate is opened, a first state of camping towards the first clamping piece when the cover plate is closed, and a second state of sliding in a direction of the component.

2. The fast clip for a roof box compartment according to claim 1, characterized in that the base is composed of a left support and a right support arranged opposite each other, and the left support and the right support are fixedly connected by bolts; the base is equipped with through holes on both sides for straps to pass through.

3. The fast clip for a roof luggage compartment according to claim 1, characterized in that the second clamping piece comprises a second sliding block portion installed in the base and a second hook portion extending downward and passing through the base, and a second passage groove is provided on a lower bottom surface of the base for the second hook portion to pass through.

4. The fast clip for a roof box compartment according to claim 3, characterized in that: the cover plate is hinged and installed at an end position of the base, a lower surface of the cover plate is provided with an installation seat, and a linkage rod is provided between the installation seat and the second clamping piece for hinged connection;

inner walls on both sides of the base are provided with sliding grooves for embedded sliding installation of the second sliding block portion.

5. The fast clip for a roof box compartment according to claim 1, characterized in that the first clamping piece comprises a first slider portion slidably installed inside the base and a first hook portion extending downward and passing through the base, and a lower bottom surface of the base is provided with a first passage groove for the first hook portion to pass through.

6. The fast clip for a roof box compartment according to claim 5, characterized in that the locking mechanism is provided with a first ratchet portion, and an inner bottom surface of the base is provided with a second ratchet portion that meshes and cooperates with the first ratchet portion;

the locking mechanism has a first state in which the first ratchet portion and the second ratchet portion mesh when not under force, and a second state in which the first ratchet portion and the second ratchet portion separate after being under force.

7. The fast clip for a roof box compartment according to claim 6, characterized in that the locking mechanism comprises:

a locking block, which is movable and installed inside the base, and the first ratchet portion is located on a lower surface of the locking block;

a connecting bolt that penetrates and connects the locking block and the first clamping piece;

an elastic component is fitted onto the connecting bolt and its two ends respectively conflict with the locking block and the first clamping;

one end of the connecting bolt is equipped with a nut.

8. The fast clip for a roof box compartment according to claim 7, characterized in that the locking block is provided with a first mounting hole for connecting bolts to pass through, and the first clamping piece is provided with a second mounting hole for connecting bolts to pass through, both of which are strip-shaped holes.

9. The fast clip for a roof box compartment according to claim 7, characterized in that: an upper surface of the locking block is provided with a pressing plate, a connection point between the connecting bolt and the locking block is located between the pressing plate and the first ratchet portion, the pressing plate is located behind the connection point and the first ratchet portion is located on a front side of the connection point, and there is a height difference between the pressing plate and the first slider part.

10. The fast clip for a roof box compartment according to claim 9, characterized in that the locking block is provided with a hook plate at a position in front of the pressing plate, and there is a distance for fingers to insert between the hook plate and the first ratchet portion.

* * * * *